United States Patent
Smullen et al.

(10) Patent No.: US 6,687,799 B2
(45) Date of Patent: Feb. 3, 2004

(54) EXPEDITED MEMORY DUMPING AND RELOADING OF COMPUTER PROCESSORS

(75) Inventors: James R. Smullen, Carmel, CA (US); Harish J. Joshi, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 227 days.

(21) Appl. No.: 10/061,552

(22) Filed: Jan. 31, 2002

(65) Prior Publication Data

US 2003/0145157 A1 Jul. 31, 2003

(51) Int. Cl.[7] .............................................. G06F 12/00
(52) U.S. Cl. ........................ 711/154; 711/104; 713/1; 713/100; 714/45
(58) Field of Search ................................ 711/104, 154; 713/1, 100; 714/5, 45

(56) References Cited

U.S. PATENT DOCUMENTS

| | | | | |
|---|---|---|---|---|
| 5,293,612 A | * | 3/1994 | Shingai | ...................... 711/159 |
| 5,339,406 A | * | 8/1994 | Carney et al. | ................. 714/45 |
| 6,543,010 B1 | * | 4/2003 | Gaudet et al. | ................. 714/45 |
| 6,615,364 B1 | * | 9/2003 | Nagasuka | ...................... 714/5 |
| 2002/0029359 A1 | * | 3/2002 | Kiyoi et al. | .................. 714/45 |

* cited by examiner

*Primary Examiner*—Hiep T. Nguyen

(57) ABSTRACT

In a computer system including a processor and a memory, a fast memory dump is conducted upon receiving an indication that the processor requires reloading. The fast memory dump is conducted by initially dumping a portion of the memory, then reloading the processor, and then conducting a post-reload dump of the remainder of the memory after reloading of the processor has commenced. As the post-reload dump continues, the remainder of the memory is gradually released for processor usage. This permits the processor to return as a resource more quickly than would be the case if a full memory dump was conducted before reloading the processor.

24 Claims, 5 Drawing Sheets

EXPEDITED MEMORY DUMPING AND RELOADING OF COMPUTER PROCESSORS

BACKGROUND OF THE INVENTION

As computer processor memory has grown in size, the time taken to dump the processor memory to another storage medium (e.g. a hard drive or magnetic tape) has increased. In particular, if it is desired to dump the memory before reloading or rebooting the processor, the total amount of time it takes for the processor to reload can be significant. As computer processor memory, which has now reached gigabyte sizes, continues to increase in size, this problem will become further exacerbated.

SUMMARY OF THE INVENTION

According to one aspect of the invention there is provided a method of initializing a computer system including a processor and memory, comprising:

receiving an indication that the processor requires reloading;

conducting a dump of a first portion of the memory;

reloading the processor;

conducting a dump of one or more further portions of the memory after reloading of the processor has commenced.

The method may further comprise:

restricting processor access to the first portion of the memory upon reloading of the processor; and releasing access to additional portions of the memory while conducting the dump of said one or more further portions of the memory.

Still further, the method may further comprise:

creating a number of processes to conduct the dump of the further portions of the memory in parallel. The step of conducting the dump after reloading may also include writing dumped memory to a data storage device, which may be networked.

In one embodiment, the step of conducting a dump after reloading is performed by a post-reload program, the post-reload program being loaded first to ensure that sufficient resources are allocated to the post-reload program.

The method may also further comprise the steps of:

checking system capabilities prior to reloading the processor; and conducting a full memory dump prior to reloading the processor if the system capabilities do not support a post-reload dump step.

Still further, the method may further comprise the steps of:

receiving a second indication that the processor requires reloading; and conducting a third dump of memory that was not dumped in the first and second dumps.

According to another aspect of the invention there is provided an article of manufacture having machine-readable instructions embodied therein for initializing a computer system including a processor and memory, the machine-readable instructions in use causing the computer system to execute a method comprising:

receiving an indication that the processor requires reloading;

conducting a dump of a first portion of the memory;

reloading the processor;

conducting a dump of one or more further portions of the memory after reloading of the processor has commenced.

According to yet another aspect of the invention there is provided a computer system including a processor and memory, the computer system being configured, upon receipt of an indication that the processor requires reloading, to:

conduct a dump of a first portion of the memory;

reload the processor;

conduct a dump of one or more further portions of the memory after reloading of the processor has commenced.

The computer system may be configured to:

restrict processor access to the first portion of the memory upon reloading of the processor; and release access to additional portions of the memory while conducting the dump of said one or more further portions of the memory.

Further aspects of the invention will be apparent from the Detailed Description of the Drawings.

BRIEF DESCRIPTION OF THE DRAWINGS

The accompanying drawings, which are incorporated in and constitute a part of this specification, illustrate several embodiments of the invention and together with the description, serve to explain the principles of the invention. Wherever convenient, the same reference numbers will be used throughout the drawings to refer to the same or like elements.

DETAILED DESCRIPTION OF THE INVENTION

To enable one of ordinary skill in the art to make and use the invention, the description of the invention is presented herein in the context of a patent application and its requirements. Although the invention will be described in accordance with the shown embodiments, one of ordinary skill in the art will readily recognize that there could be variations to the embodiments and those variations would be within the scope and spirit of the invention.

Figure 1:
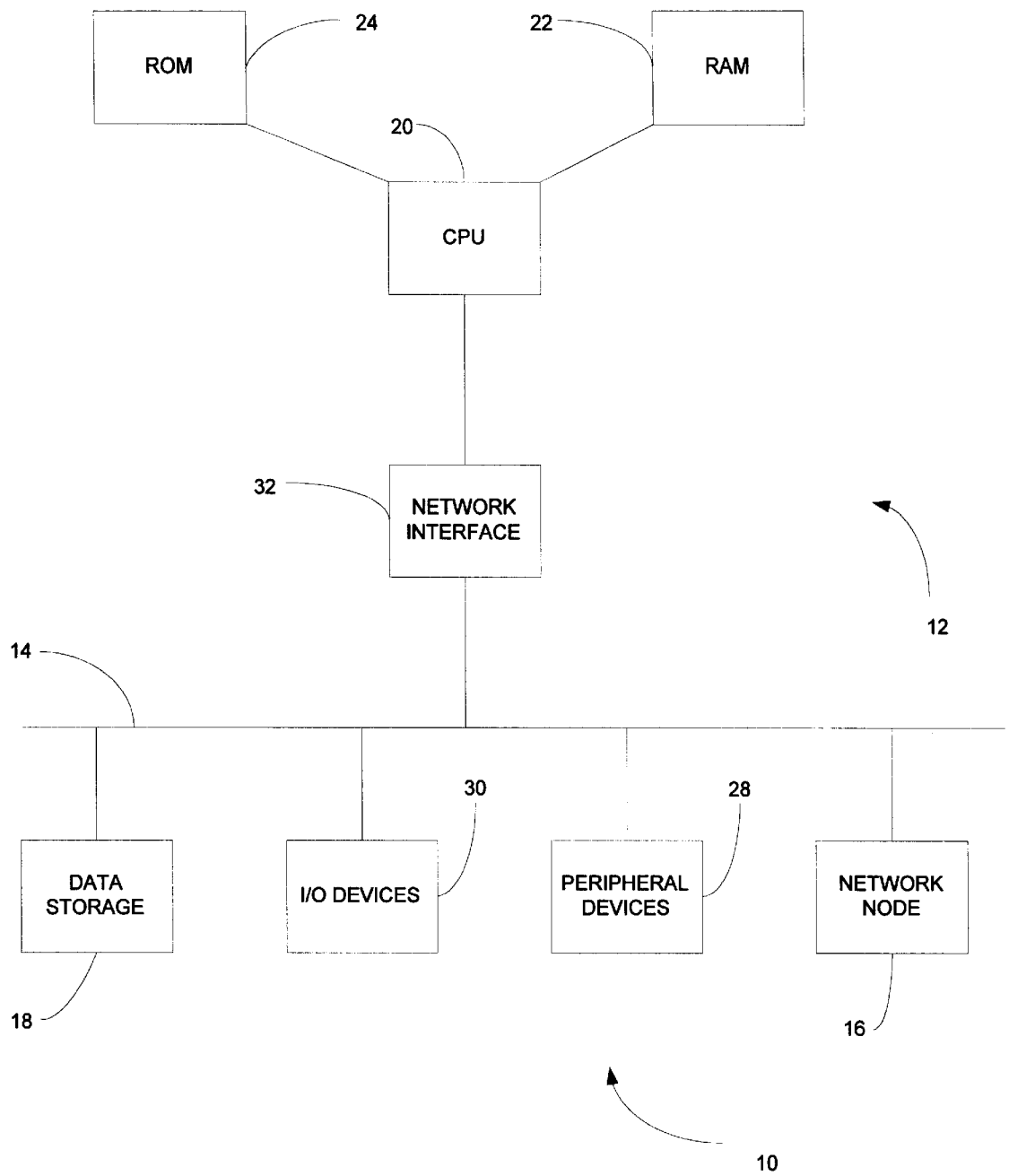
FIG. 1 is a schematic diagram illustrating a system according to one aspect of the invention.

Referring now to the figures, and in particular FIG. 1, shown is a computer system 10 in which the method is implemented. The system 10 includes network nodes 12 and 16, a network 14, and networked data storage 18. The network node 12 includes one or more central processing units (CPUs) 20, random access memory (RAM) 22 and read-only memory (ROM) 24. The network node 12 is coupled to the network 14 by means of a network interface 32. The system 10 also includes peripheral and I/O devices 28, 30 that are used by the network node 12.

The network 14 may be any type of wired or wireless computer network, but in the illustrated embodiment is a high speed interconnect known as a System Area Network (SAN). Examples of SANs include the Compaq Computer Corporation Servernet™ and the SAN proposed by the Infiniband Trade Association. The network 14 may also be coupled to external networks such as the Internet. Note that the invention may also be applied to a standalone (i.e. not networked) computing device, but that this is not preferred.

The network node 16 may be any networked device, but in most cases has a similar configuration to the network node 12. The system 10 also typically includes an administrative function that is embodied in one of the network nodes 16. The administrative function keeps track of the availability of system resources, and allocates new tasks and performs system maintenance functions as appropriate.

Figure 2:
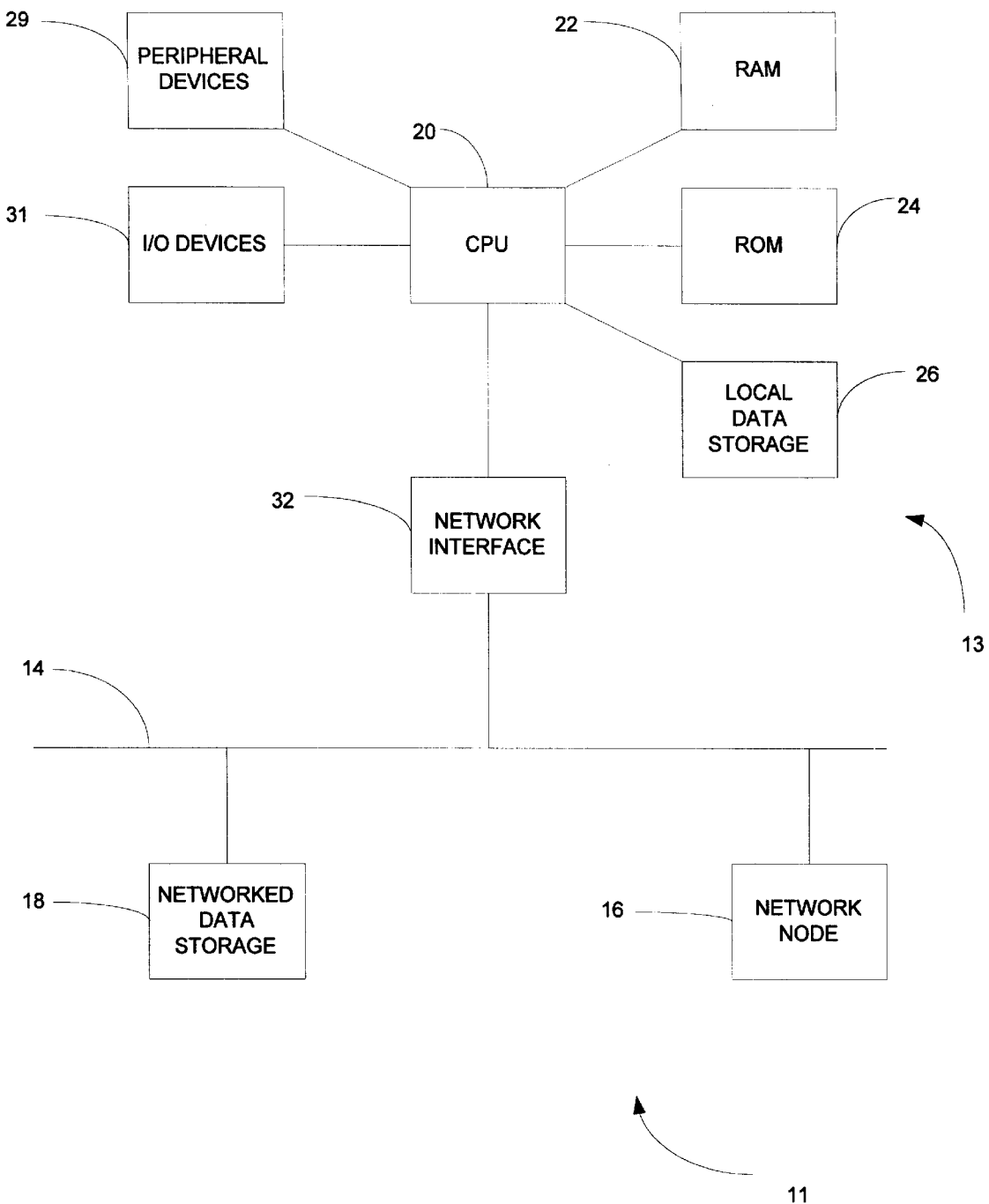
FIG. 2 is a schematic diagram of one alternative to the system of FIG. 1.

An alternate system 11 is illustrated in FIG. 2. In the system 11, a network node 13 is further provided with local data storage 26, as well as local peripheral and I/O devices 29, 31. Of course, network node 13 may still utilize networked data storage and I/O or peripheral devices as is the case for system 10 of FIG. 1.

When a memory dump occurs, the contents of the memory (i.e. RAM 22) is written to a storage device. The storage device may be the local data storage 26 or the networked data storage 18. If the CPU 20 supports processor cache, the memory is made coherent with the processor cache before dumping.

In the network node 12, 13 a fast memory dump is performed in two steps, an initial dump step and a post-reload dump step. In the initial dump step, when a failure occurs (e.g. a software error), only a part of the total memory is dumped. The amount of memory dumped in the initial dump step is sufficient for the CPU 20 to be reloaded and operated normally, albeit without being able to utilize the entire memory. When the initial dump step is completed, the CPU 20 is reloaded. After the CPU 20 is reloaded, the remainder of the memory is then dumped and released back for utilization by the CPU 20. The post-reload dump step occurs while the CPU 20 is alive and available as a resource for running applications.

By dumping only a part of the total memory before reloading the CPU 20, the amount of time that the CPU 20 is lost as a resource is reduced. The full functionality of the network node 12 will gradually be restored as the memory is returned to the CPU 20 in the post-reload dump step.

The fast memory dump functionality is provided in the system by means of a program known as RCVDUMP. RCVDUMP typically runs in a CPU (either networked or local) other than the CPU 20 that is halted, and makes calls to the halted CPU 20 to request memory pages. RCVDUMP is able to function to provide either a conventional memory dump (in which the entire memory is dumped before reloading the CPU 20) or to provide the fast memory dump capability, depending on which parameters are passed with a call to the RCVDUMP program. For a fast memory dump, RCVDUMP is called with the PARTMEM and RELOAD options. The PARTMEM option tells RCVDUMP initially to dump only part of the halted CPU's memory. The size of the initial dump may be explicitly defined with a size, for example in MB, or it may default to a system value, the latter being the preferred option.

The particular size of the initial memory dump will be implementation-dependent, but will typically be a tradeoff between the desire to complete the initial dump rapidly, while ensuring that sufficient memory is available to provide necessary processor functionality immediately after the CPU 20 has been reloaded. The PARTMEM option will also cause the CPU 20, upon initialization, to invoke a GETDUMP process (defined below) to dump the remainder of the memory.

The RELOAD option tells RCVDUMP to invoke the necessary system call to cause CPU reloading upon completion of the partial or complete memory dump. This option may be used with or without the PARTDUMP option.

In addition to the PARTMEM and RELOAD options, further options may be provided. For example, as an alternative to defining the size of the initial memory to be dumped, it may be desirable to define start and ending memory addresses for the memory to be dumped. Defining a start address for a memory dump may be useful if the CPU 20 reload fails. In such a case, there may be a need to dump the original memory that was not dumped in the original RCVDUMP command, and thus there is a need to accept a start address as a parameter. If not specified, the start address will default to the start of the memory. Similarly, the initial dump step is designed to dump only part of the total memory, therefore, by defining an ending memory address that is less than the end of memory, the initial dump size can be defined. If the ending memory address is not defined, the ending memory address will default to the end of memory.

In addition to options that may be passed to the RCVDUMP program, the RCVDUMP program will itself make a number of calls or messages to accomplish its task. When RCVDUMP starts, it will send a system message to an system administrator node indicating that it is about to initiate a memory dump. After that, RCVDUMP will call to the halted CPU 20 for system-specific information, such as operating system software versions, the amount of memory to dump if not specified, and any pertinent information about the halted CPU 20. Using this information, the RCVDUMP program will determine whether the low level operating system software supports a fast memory dump procedure and, if so, will proceed with the fast memory dump as described herein. If RCVDUMP determines that the low level operating system software does not support the fast dump functionality, it will proceed with a conventional memory dump and CPU 20 reload.

When actually performing the memory dump, RCVDUMP will call for a block of memory from the halted CPU. The block of memory is compressed in the halted CPU 20 before transmission to the CPU executing RCVDUMP, using a conventional data compression scheme. Alternatively, upon receiving the memory, RCVDUMP could compresses the memory block, but this is not preferred. RCVDUMP then writes the compressed memory block to an appropriate storage medium, such as a hard drive, located at either the local data storage 26 or the networked data storage 18. RCVDUMP then continues to request, receive, and store subsequent memory blocks until the initial portion of the memory up to the initial dump size has been dumped. RCVDUMP then notifies the system 10, 11 that the initial memory dump is complete, and configures a generic GETDUMP program for the halted CPU 20. RCVDUMP then terminates and invokes a subroutine to reload the halted CPU 20.

The halted CPU 20 is then reloaded. During this process, the boot code clears all of the memory up to the initial dump size, and makes the memory up to the initial dump size available for CPU 20 usage. The GETDUMP program is then started in the previously halted CPU 20. To ensure that the resources needed for the GETDUMP program are not preempted by system services that are to run on the reloaded CPU 20, the GETDUMP process always runs first. This can be done by holding off notification to the system 10, 11 that the CPU 20 has reloaded until the post-reload dump processes have been created successfully.

In a similar manner to the RCVDUMP program, the GETDUMP program reads subsequent blocks of undumped memory, compresses them, and routes them to storage in a partitioned dump-file format. Compression takes place in the reloaded CPU 20. As the subsequent memory blocks of the undumped memory are written to the storage, the memory previously occupied by that particular memory block is first cleared and then the node 12 is notified that the memory is available for general use. In this manner, the available memory to the node 12, 13 will progressively increase in size as the GETDUMP process proceeds, resulting in a progressive return to full system functionality.

To speed up the post-reload memory dump, the GETDUMP program may start a number of copies of itself, with each copy targeting a different region of undumped memory and a different disk file. By conducting the memory dump in parallel in this manner, the return of memory for system use, and the return to full system functionality, will be hastened. In such a case, the copies of the GETDUMP program will report to the original master GETDUMP program upon completion, and the GETDUMP master program will then terminate. It may also be useful to provide a count of the undumped pages, which can then be decremented as the pages are released to memory. The undumped page count may be used by the node 12 for evaluating its own capabilities, or by an administrator to evaluate the progress of the GETDUMP programs.

Figure 3:
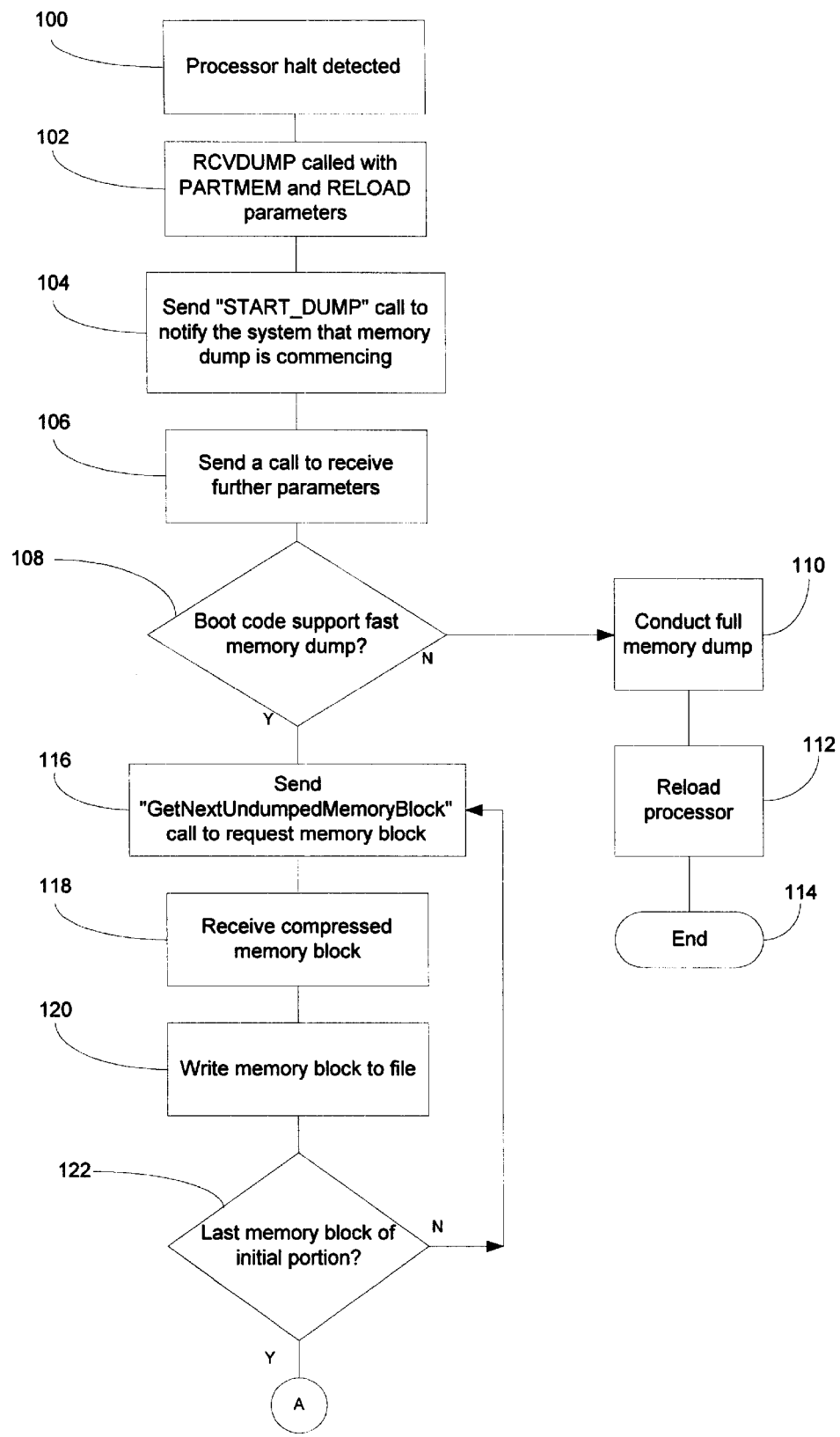
FIGS. 3, 4 and 5 are a flowchart illustrating an exemplary method in accordance with the invention
Figure 4:
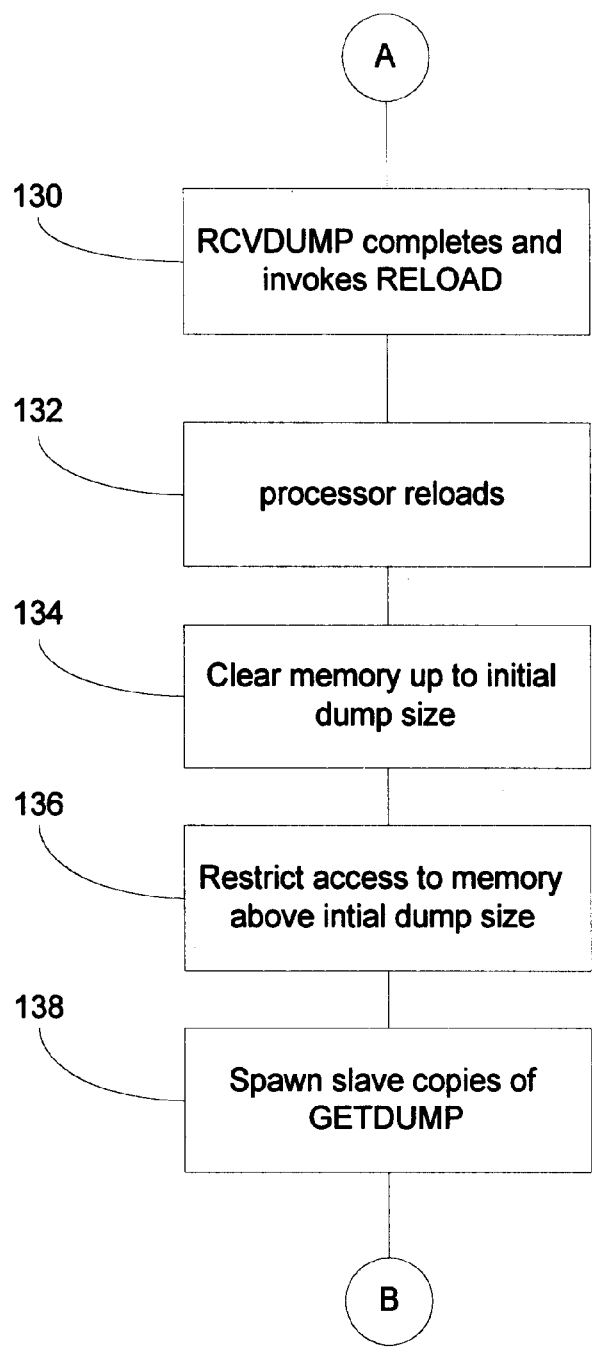
Figure 5:
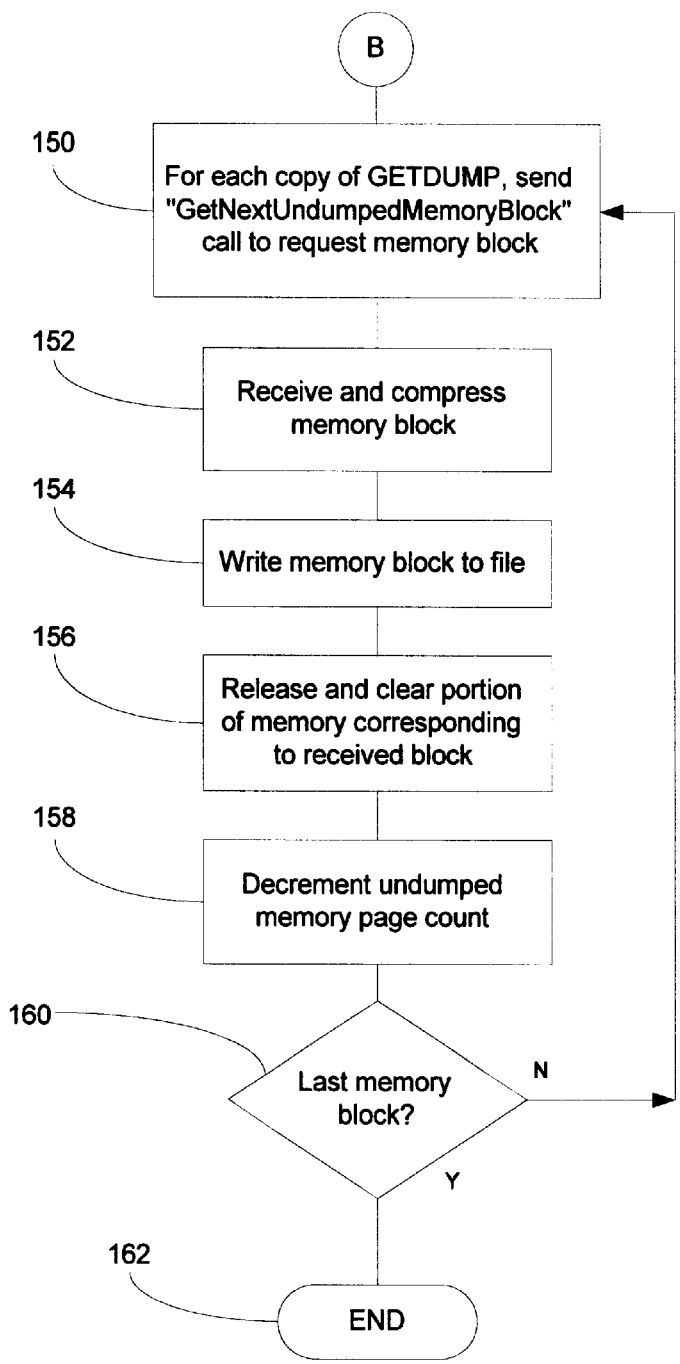

FIGS. 3 to 5 illustrate an exemplary flow chart for the methods described above. As shown in FIG. 3, the fast memory dump process is triggered by the detection of a CPU halt 100. Upon detection of the CPU halt, the RCVDUMP program will be called 102 with the PARTMEM and RELOAD options. RCVDUMP will then send a START_DUMP call to notify the system 10, 11 that a memory dump is commencing 104. RCVDUMP will then send a call 106 to CPU 20 to receive any needed parameters. As described above, these will typically be the size of the memory for the initial dump, as well as low level software versions to indicate whether or not the low level software supports 108 the fast memory dump procedure. If the low level software does not support the fast memory dump procedure, RCVDUMP will conduct a full memory dump 110 and reload 112 the CPU 20. At this stage the RCVDUMP program will terminate 114.

If the low level software supports the fast memory dump procedure, RCVDUMP will then send a GetNextUndumpedMemoryBlock call 116 to request an identified memory block. Upon receipt of a compressed memory block, RCVDUMP will write the memory block to a file 120. RCVDUMP will then check to see if the memory block that has been written to the file is the last memory block 122. If it is not the last memory block, the RCVDUMP will request another memory block 116, and continue until the last memory block of the initial portion is reached. The flowchart then continues as shown in FIG. 4.

After writing the last block of the initial memory portion to disk, RCVDUMP completes 130 and invokes the RELOAD procedure. At this time, RCVDUMP will also configure a generic GETDUMP program to conduct the dump of the remaining memory after the CPU 20 has reloaded. After RCVDUMP completes, the CPU 20 reloads 132. Upon CPU 20 reload, the memory up to the initial dump size is cleared 134 and made available for CPU 20 use. Access to memory above the initial dump size 136 is restricted. GETDUMP, and any slave copies thereof, are then started 138.

Turning to FIG. 5, each copy of GETDUMP will the send a GetNextUndumpedMemoryBlock call to request 150 an appropriate memory block. Each copy of GETDUMP will then receive and compress 152 the requested memory block. The compressed memory block(s) will then be written 154 to a dump file corresponding to the particular copy of the GETDUMP program. The portion of memory corresponding to the written memory block is then released for system usage 156 and cleared. The undumped memory page count is then decremented 158. Each copy of GETDUMP then checks to see whether the memory block that has been dumped corresponds to the last memory block allocated to that copy of GETDUMP 160. If it is not the last memory block, a further memory block is requested 150. Steps 150–158 are then repeated until the last memory block is reached. At this time, the particular copy of GETDUMP will terminate 162. When all the copies of GETDUMP have terminated, the GETDUMP MASTER program will also terminate. At this time, there will be as many dump files as there were copies of the GETDUMP program, and a utility may be provided to assemble the dump files, including the initial dump file generated by the RCVDUMP program, into a single dump file.

In the event that the reloaded/reloading processor is halted before the GETDUMP MASTER and the copies thereof have completed dumping and releasing the memory, it is still possible to obtain a complete or substantially complete dump of the original contents of the memory. This can be done by running RCVDUMP for a second time in a CPU (either networked or local) other than the twice-halted CPU 20, initiated by administrative function that is embodied in one of the network nodes 16. This second instance of RCVDUMP makes calls to the twice-halted CPU 20 to request memory pages from the memory that was not released to the twice-halted CPU during its reload procedure. This can be done by configuring an instance of RCVDUMP with a start address that is the beginning of the memory that was not released to the twice-halted CPU and an end address that is the end of the memory. A substantially complete dump file can then be generated by assembling the dump files generated: a) by the original instance of RCVDUMP (i.e. the initial dump, corresponding to the memory that was available to the CPU 20 initially upon reload); b) by any instances of GETDUMP (i.e. corresponding to memory that was released to the CPU 20 post-reload); and c) by the second instance of RCVDUMP (i.e. corresponding to the memory not released to the CPU 20).

Additionally, in the case of a twice-halted CPU, it may be desirable to conduct a dump of the memory that was available to the twice-halted CPU. In such a case, another instance of RCVDUMP may be initiated by the administrative function, with a start address corresponding to the start of the memory and with an end address corresponding to the end of the memory that was available to the CPU 20 during the failed reload.

As will be apparent from the above description, the methods described with reference to FIGS. 3 to 5 are typically embodied in a computer system, such as the system 10 of FIG. 1 or system 11 of FIG. 2, which are configured by a set of software instructions to execute the described methods. It should be noted however that the methods described above may also be embodied as a set of machine-readable instructions embodied in an article of manufacture such as an optical or magnetic disc, or embodied in a carrier wave.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only.

What is claimed is:

1. A method of initializing a computer system including a processor and a memory, comprising:

receiving an indication that the processor requires reloading;

conducting a first dump of a first portion of the memory;

reloading the processor;

conducting a second dump of one or more further portions of the memory after reloading of the processor has commenced.

2. The method of claim 1 further comprising:

restricting processor access to the first portion of the memory upon reloading of the processor; and releasing access to additional portions of the memory while conducting the second dump of the one or more further portions of the memory.

3. The method of claim 1 further comprising:

creating a number of processes to conduct the second dump of the further portions of the memory in parallel.

4. The method of claim 1 wherein the step of conducting the second dump after reloading includes:

writing dumped memory to a data storage device.

5. The method of claim 4 wherein the data storage device is a networked data storage device.

6. The method of claim 1 wherein the step of conducting the second dump after reloading is performed by a post-reload program, the post-reload program being loaded first to ensure that sufficient resources are allocated to the post-reload program.

7. The method of claim 1 further comprising the steps of:

checking system capabilities prior to reloading the processor; and conducting a full memory dump prior to reloading the processor if the system capabilities do not support a post-reload second dump step.

8. The method of claim 1 further comprising the steps of:

receiving a second indication that the processor requires reloading; and conducting a third dump of memory that was not dumped in the first and second dumps.

9. An article of manufacture having machine-readable instructions embodied therein for initializing a computer system including a processor and a memory, the machine-readable instructions in use causing the computer system to execute a method comprising:

receiving an indication that the processor requires reloading;

conducting a dump of a first portion of the memory;

reloading the processor;

conducting a dump of one or more further portions of the memory after reloading of the processor has commenced.

10. The article of manufacture of claim 9 wherein the method further comprises:

restricting processor access to the first portion of the memory upon reloading of the processor; and releasing access to additional portions of the memory while conducting the dump of said one or more further portions of the memory.

11. The article of manufacture of claim 9 wherein the method further comprises:

creating a number of processes to conduct the dump of the further portions of the memory in parallel.

12. The article of manufacture of claim 9 wherein the step of conducting the dump after reloading includes:

writing dumped memory to a data storage device.

13. The article of manufacture of claim 12 wherein the data storage device is a networked data storage device.

14. The article of manufacture of claim 9 wherein the step of conducting a dump after reloading is performed by a post-reload program, the post-reload program being loaded first to ensure that sufficient resources are allocated to the post-reload program.

15. The article of manufacture of claim 9 wherein the method further comprises:

checking system capabilities prior to reloading the processor; and conducting a full memory dump prior to reloading the processor if the system capabilities do not support a post-reload dump step.

16. The article of manufacture of claim 1 wherein the method further comprises the steps of:

receiving a second indication that the processor requires reloading; and conducting a third dump of memory that was not dumped in the first and second dumps.

17. A computer system including a processor and memory, the computer system being configured, upon receipt of an indication that the processor requires reloading, to:

conduct a dump of a first portion of the memory;

reload the processor;

conduct a dump of one or more further portions of the memory after reloading of the processor has commenced.

18. The computer system of claim 17 being further configured to:

restrict processor access to the first portion of the memory upon reloading of the processor; and release access to additional portions of the memory while conducting the dump of said one or more further portions of the memory.

19. The computer system of claim 17 being further configured to:

create a number of processes to conduct the dump of the further portions of the memory in parallel.

20. The computer system of claim 17 further comprising a data storage device to which dumped memory is written.

21. The computer system of claim 20 wherein the data storage device is a networked data storage device.

22. The computer system of claim 17 further comprising a post-reload program to conducting the dump after reloading, the computer system being configured to load the post-reload program first to ensure that sufficient resources are allocated to the post-reload program.

23. The computer system of claim 17 being further configured to:

check system capabilities prior to reloading the processor; and conduct a full memory dump prior to reloading the processor if the system capabilities do not support a post-reload dump step.

24. The computer system of claim 17 being further configured to:

receive a second indication that the processor requires reloading; and conduct a third dump of memory that was not dumped in the first and second dumps.

* * * * *